Jan. 13, 1953  G. B. DAVIS, JR  2,625,642
AUTOMATIC HEATER FOR COFFEE MAKERS AND THE LIKE
Filed March 31, 1947  3 Sheets-Sheet 1
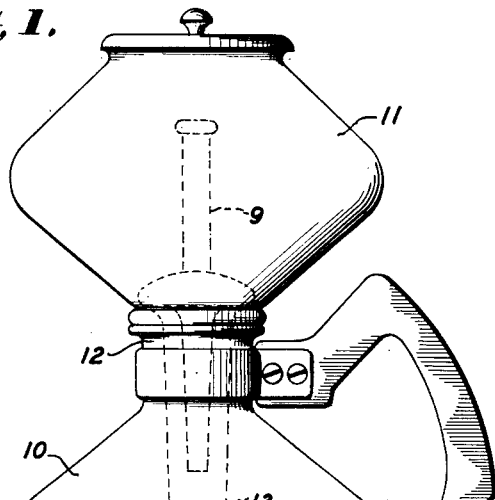
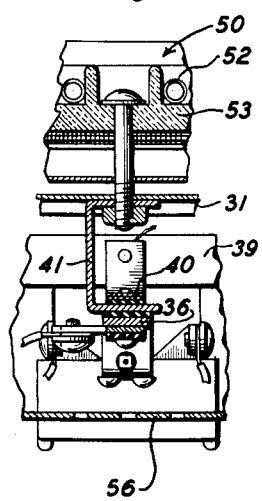
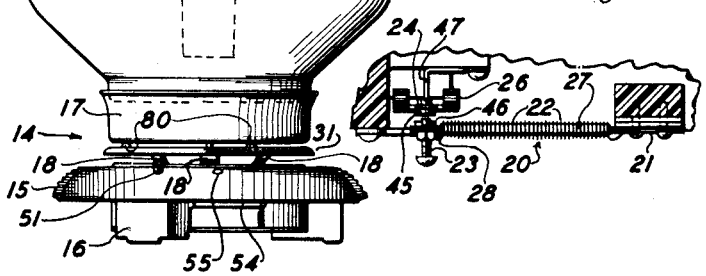
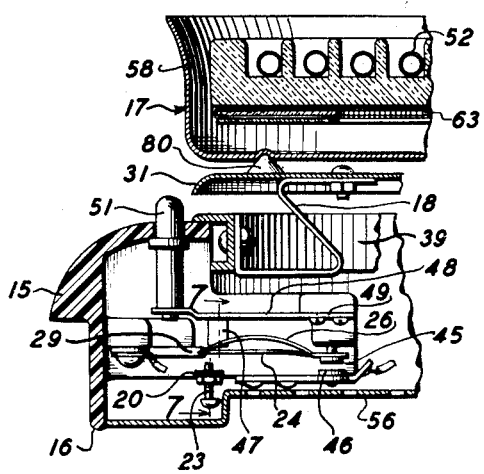
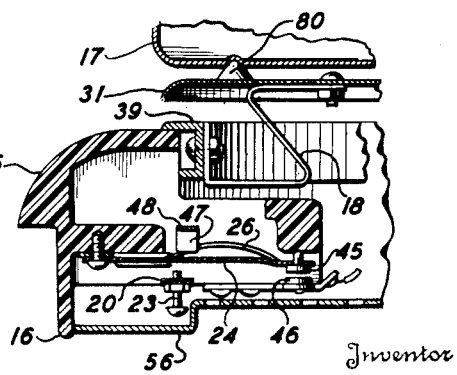
Inventor
George B. Davis, Jr.
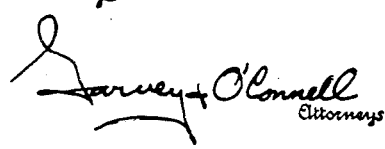
By Harvey & O'Connell
Attorneys Jan. 13, 1953　　　　　　G. B. DAVIS, JR　　　　　2,625,642
AUTOMATIC HEATER FOR COFFEE MAKERS AND THE LIKE
Filed March 31, 1947　　　　　　　　　　　　3 Sheets—Sheet 2

Inventor
George B. Davis, Jr.
By
Harvey & O'Connell
Attorneys

Jan. 13, 1953 G. B. DAVIS, JR 2,625,642
AUTOMATIC HEATER FOR COFFEE MAKERS AND THE LIKE
Filed March 31, 1947 3 Sheets-Sheet 3

Inventor
George B. Davis, Jr.
By Harvey O'Connell
Attorneys

Patented Jan. 13, 1953

2,625,642

UNITED STATES PATENT OFFICE 2,625,642

AUTOMATIC HEATER FOR COFFEE MAKERS
AND THE LIKE

George B. Davis, Jr., Washington, D. C.

Application March 31, 1947, Serial No. 738,310

1 Claim. (Cl. 219—43)

This invention relates to automatic heaters for vessel-contained liquids, and more particularly to heaters having means responsive to vibrations caused by the boiling of the liquid to decrease or cut off the heat. The automatic heater for vessel-contained liquids disclosed in this application embodies certain new and useful improvements over the structure disclosed in Patent No. 2,385,694 issued to me on September 25, 1945, and over the structures disclosed in my copending applications, Serial Nos. 614,917 and 614,918, filed by me under date of September 7, 1945, which have resulted in Patents Nos. 2,567,187 and 2,567,188.

This invention presently appears to have its greatest usefulness in connection with coffee makers of the vacuum type (having water heating and coffee steeping vessels in liquid communication). In the use of coffee makers of the vacuum type, it is the usual practice to cut off the heat manually as soon as the water has been transferred from the water heating receptacle to the coffee steeping receptacle. Like my former applications, this invention has as one of its objects the provision of a control for the heater which renders it completely automatic after the heat has been turned on. After considerable experimentation and test I have invented an automatic control which represents great improvement over my previous inventions. Therefore it is an object of this invention to provide an improved heater for vacuum-type coffee makers, the heater having a control mechanism responsive to the vibrations present in all such coffee makers during the last part of the brewing operation and operative to reduce the heat thereby allowing the brew to return to the water heating vessel.

It is another object to provide an improved automatic control for heaters of vessel-contained liquids.

It is a further object to provide an automatic control which shuts off the heat after the water has been allowed to boil for a period of time sufficient to properly brew the coffee.

It is a further object to provide a positively-acting automatic control for shutting off the heat, the control not being affected by casual or accidental shaking or disturbance of a supporting table or the coffee maker itself.

Other objects and advantages will be apparent to those skilled in the art from the following description taken in conjunction with the drawings wherein:

Figure 1 is an elevation view of a vacuum type coffee maker on a resilient support having an electric heater therein.

Figure 4 is a fragmentary sectional view of the support taken substantially in the plane of the line 4—4 of Figure 2.

Figure 5 is a fragmentary sectional view of the support taken substantially in the plane of the line 5—5 of Figure 2.

Figure 6 is a fragmentary elevation view of the support taken in the plane of the line 6—6 of Figure 3.

Figure 7 is a fragmentary sectional view taken in the plane of the line 7—7 of Figure 4.

Figure 2:
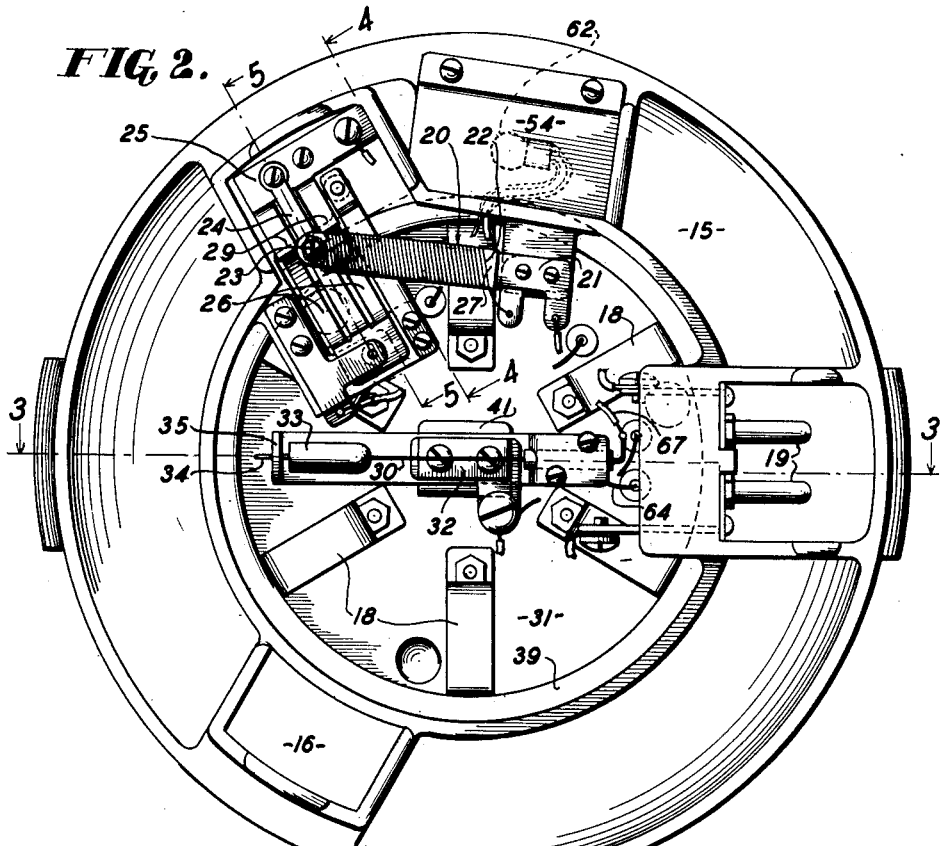
Figure 2 is a worm's-eye view of the bottom of the support with the protective cover plate removed showing elements of the control in the support.

In reference to Figure 1, this invention is shown as applied to a coffee maker comprising a lower water heating vessel or bowl 10 and an upper coffee infusion vessel or bowl 11. The lower bowl is provided at its upper portion with an upright neck 12 within which depends a tubular extension 13 which is attached to the lower portion of the upper bowl. This extension or tube constitutes a passageway for liquid communication. Seated within the bottom of the coffee infusion bowl 11 is a suitable filter 9.

In the operation of coffee makers of this type, water is placed in lower vessel 10, coffee grounds are placed in upper vessel 11 and heat is applied by the heating element to the water in the lower vessel. When sufficiently heated, the water in lower vessel 10 rises through tube 13 to the upper vessel 11 where it brews the coffee. Upon removal of heat from the lower bowl the water vapor therein condenses and the vacuum thereby created is sufficiently great to cause the coffee brew in the upper bowl to pass through the filter 9 into the lower bowl. The usual practice is to cut off the heat manually upon transfer of the water to the upper bowl, permitting the brew to return to the lower bowl.

The bowls 10 and 11 are supported by, and heat is applied to the bottom of the bowl 10 by a stove or heater 14. In general, the stove or heater 14 comprises a base 15 formed of a suitable phenol condensation product, such as plastic, and equipped with feet 16; a vessel supporting assembly 17 disposed above the base 15; and a heat baffle 31 disposed intermediate the base and supporting assembly and spaced therefrom, as shown in Figure 1.

In accordance with this invention, base 15 of the stove is characterized by an annulus 39 to which are secured in any suitable manner, as by being bolted thereto, a series of resilient brackets 18. To the upper ends of these brackets there is bolted or otherwise secured the heat baffle 31. Teats 80 rise from baffle 31 and engage recesses provided in the underside of a shallow pan-like casing 58 forming part of the bowl supporting assembly 17, for supporting the latter in vertically spaced relation to the baffle 31, as shown to advantage in Figures 4 and 5.

Figure 3:
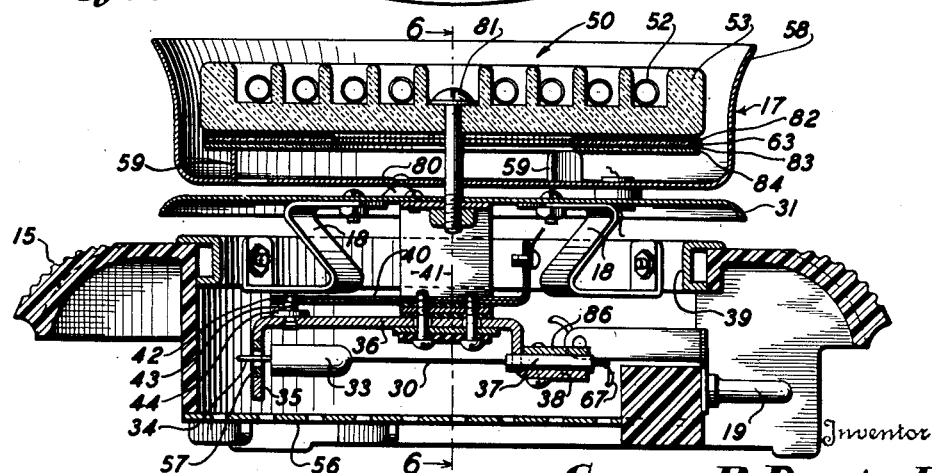
Figure 3 is a sectional elevation view of the support taken in the plane of the line 3—3 of Figure 2.

Arranged within the casing 58 is an electric heating assembly indicated generally by the reference numbered 50. This assembly comprises a ceramic supporting plate 53 having in its top surface channels in which is accommodated a main heating coil 52. At the underside of the plate 53 is an annular auxiliary heating coil 63 insulated on both sides by mica annuli 82, 83, and confined between the plate 53 and an annular metallic wear plate 84. Wear plate 84 rests upon legs 59 rising from the bottom wall of casing 58 and serving to support the heating assembly 50 in elevated position within the casing. Perforations formed in the bottom wall of casing 58 by having the legs 59 struck upwardly therefrom provide for a circulation of air about the heating coil 52 for effecting a desired quick cooling of the latter subsequent to a cut-off of current flowing therethrough. Bolt 81 passing through the center of plate 53, through the bottom wall of casing 58 and the anchored baffle plate 31 removably secures the heating assembly 50 within the casing 58 and the entire vessel supporting assembly 17 in assembled relation with baffle 31 and base 15 as best shown in Figure 3.

Base 15 is provided with a chamber that houses an electric signal lamp 62. This chamber is provided with a colored sight window 55 (Figure 1) and access to the chamber is had by removing cover plate 54 (Figure 2).

Figure 8:
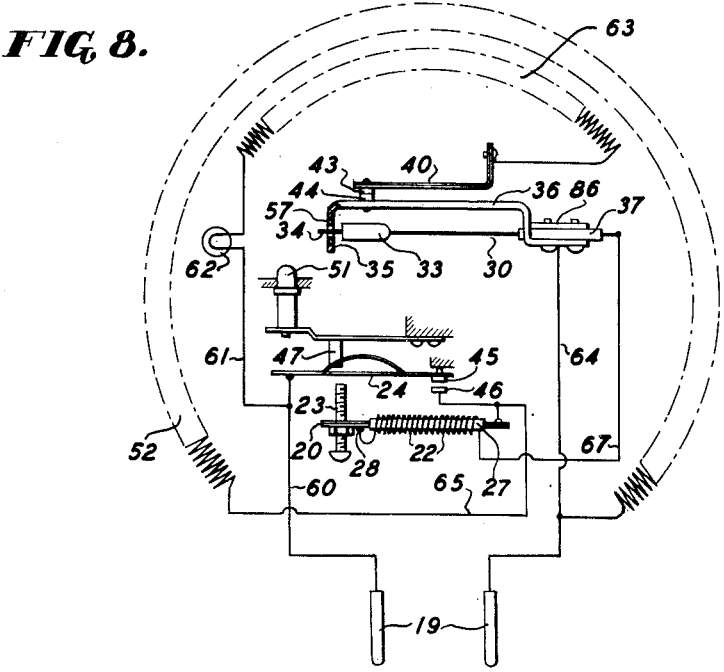
Figure 8 is a schematic diagram showing the elements of the heater and control and the electrical connections therebetween.
Figure 9:
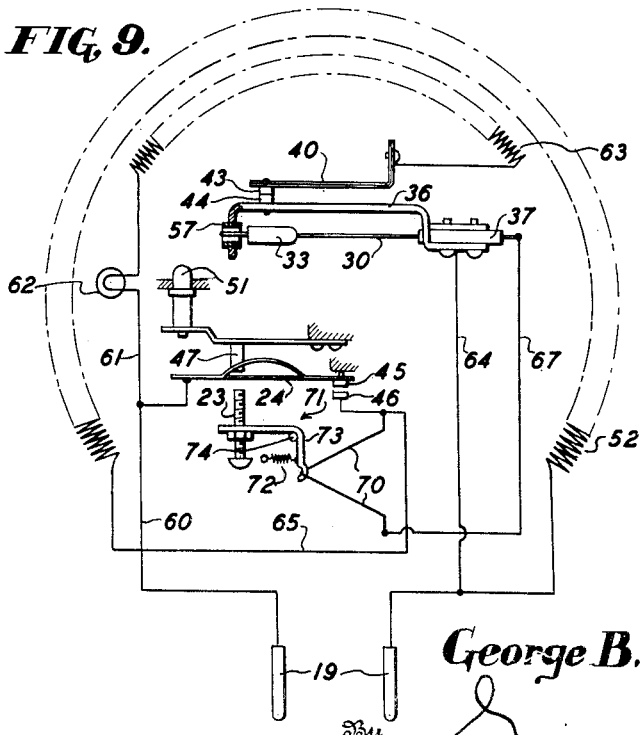
Figure 9 is similar to Figure 8 but shows an alternative form of the invention wherein a heat-sensitive wire and switch actuator is substituted for the bimetallic strip and heater coil of the embodiment shown in Figure 8.

The heating elements 52 and 63, and signal lamp 62 are supplied with current through a pair of terminal pins 19 (Figures 8 and 9). These pins are mounted in a recess in base 15 (Figure 2), and adapted to be engaged by the usual plug of an electrical appliance cord.

Energization of heating elements 52, 63 and signal lamp 62 is controlled by mechanism housed within the confines of base 15. Various control mechanisms and methods have been employed in an effort to automatically cut off or reduce the heat applied to the water heating bowl after the water has been transferred to the infusion bowl so that the brew is automatically caused to return to the water heating receptacle or bowl, and thus dispense with the former practice of cutting off the heat manually following such transfer of the water. As a result of experimentation over a considerable period of time, I have found that for the purpose stated the most effective automatic control is one which is operative in response to the vibrations of the coffee vessel, a functional characteristic of vacuum-type coffee makers. Various types of controls operative responsively to the vibrations of the coffee vessel have been described and claimed by me in Patent Number 2,385,694, granted September 25, 1945 and in my aforementioned pending applications. The control mechanism now to be described embodies certain new and useful improvements over those just mentioned.

The various elements or components and their structural details will now be specifically pointed out; the electrical connections between the several components and the overall operation of the control mechanism being subsequently explained with reference to the circuit diagrams of Figures 8 and 9. Thus:

Bimetallic strip 20 is secured at one end 21 to a protrusion of base 15. A mica insulator 27 surrounds bimetallic strip 20 and has wound thereon a high resistance wire or heating element 22 which is insulated from bimetallic strip 20 except at 28 where it is electrically connected to the free end of the strip as shown to advantage in Figure 7. The free end of bimetallic strip 20 has mounted thereon an adjustable actuating screw 23 which is operative to act upon snap switch 24.

The fixed end of snap switch 24 is secured to base 15 at 25 by ordinary fastening means. The free end of snap switch 24 is integral with the ends of spring legs 26, the other ends of legs 26 being constrained by socket members 29 having V-shaped sockets therein as shown to advantage in Figure 4. As shown in Figures 4, 5 and 7, the free end of snap switch 24 has an electrical contact 45 mounted thereon which is in operative relationship with stationary electrical contact 46 mounted on a protrusion of base 15.

As has been explained, snap switch 24 is acted upon one side by actuating screw 23 of bimetallic strip 20. The other side of snap switch 24 is acted upon by tab 47 formed on spring member 48 which has its stationary end secured at 49 to base 15. The movable end of spring member 48 carries a button 51, the end of which extends through a hole in base 15 making it easily accessible to the user. Spring member 48 is shown in its normal position from which it may be deflected by means of push button 51. It is apparent that contacts 45 and 46 may be opened by bimetallic strip 20 and may be closed by button 51. By virtue of the constrained spring legs 26, snap switch 24 will maintain the contacts 45 and 46 in whichever position they are placed.

At the underside of heat baffle 31 and extending into the base 15 is a bracket 41, secured in position by the aforementioned bolt 81. This bracket provides a support for a vibrative element assembly and an auxiliary heating circuit switch, presently to be described. (See Figures 3 and 6.)

The vibrative element assembly is electrically insulated from bracket 41 and includes mounting structure 36, the end 38 thereof cooperating with a member 86 to provide a clamp for an insulating sleeve 37 surrounding the fixed end of vibrative element 30. Electrical connection to the fixed end of the vibrative element is made through lead 67. Electrical connection to mounting structure 36 is made through lead 64. The other end 35 of mounting structure 36 is bent and punched to provide a cage for the free end 34 of vibrative element 30. The end 34 of vibrative element 30 is silver or tungsten coated and a silver or tungsten annular contact insert 57 is provided in cage 35 to prevent deterioration of the parts as a result of frequent electrical contacts. A weight 33 is mounted on vibrative element 30 intermediate the ends thereof. It is apparent that in the use of the automatic coffee heater, vibrations of the coffee vessel are transmitted to mounting structure 36 and the inertia of weight 33 causes vibrative element 30 to oscillate thereby making a series of momentary electrical contacts between end 34 and insert 57. The pulses of current that are allowed to flow as a result of the momentary contacts act to shut off the main heating coils in a manner to be subsequently explained.

The auxiliary heating circuit switch consists of a bimetallic strip 40 secured to and electrically insulated from U-shaped bracket 41. The free end 42 of bimetallic strip 40 has an electrical contact 43 thereon which mates with a stationary electrical contact 44 mounted on and in electrical connection with mounting structure 36. In operation, bimetallic strip 40 is responsive to heat from the heating assembly generally designated 50, the major portion of the heat being conducted to the strip 40 through U-shaped bracket 41.

For the base 15 there is provided a protective perforated bottom plate 56 to allow circulation of cooling air, to protect the mechanism located within the base from injury due to handling, and as a safety shield to guard the user from electrical shock.

Referring now to Figure 8 for the circuit diagram and an explanation of the operation of the invention; when an electric cord is connected to pins 19, electricity is allowed to flow through wire 60, wire 61, indicating light 62, auxiliary heating element 63, bimetallic strip 40, contacts 43 and 44, mounting structure 36 and wire 64. A limited amount of heat is then applied to the coffee making vessel. The main function however, of auxiliary heating element 63 is to maintain the finished coffee at a warm temperature.

When it is desired to start making the coffee, button 51 is momentarily pressed down thereby acting through tab 47 to close contacts 45 and 46. Electricity is now permitted to flow from pins 19 through wire 60, through snap switch 24, through contacts 45 and 46, wire 65, main heating element 52 and back to the source. A large amount of heat is now applied to the coffee making vessel and when the water in lower vessel 10 gets hot enough, the water rises to the upper vessel 11 and starts bubbling, thereby shaking the entire coffee vessel which is resiliently mounted on vessel support 17. Since vibrative element 30 is depended from the vibrating vessel support 17, vibrative member 30 is made to oscillate. When the oscillations reach a certain amplitude, the free end 34 of the vibrative element makes a series of momentary contacts with contact insert 57 on cage 35. There results a series of pulses of current which flow from pins 19, through wire 60, snap switch 24, closed contacts 45 and 46, resistance wire 22, wire 67, vibrative element 30, mounting structure 36, wire 64 and back to the source. The plurality of pulses of current gradually warm resistance wire 22 until a temperature is reached which causes bimetallic strip 20 to open contacts 45 and 46 by pressing actuating screw 23 against snap switch 24. When contacts 45 and 46 are thus opened, the current going to the main heating element 52 is cut off and the brewed coffee is allowed to return to the lower vessel 10.

It is to be noted that auxiliary heating element 63 remains operative so long as pins 19 are connected to the source of electricity and contacts 43 and 44 remain closed. The function of auxiliary heating element 63 is to supply a small amount of heat to keep the finished coffee warm and ready for use. Bimetallic strip 40 operates responsively to the heat in the heating element assembly 50. In other words, bimetallic strip 40 opens contacts 43 and 44 when there is a considerable amount of heat in the heating element assembly 50 and closes contacts 43 and 44 when the heat decreases to a pre-set amount. Indicating light 62 is provided to show when the auxiliary heating element 63 is operative, thereby indicating to the user that if it is no longer desired to maintain the finished coffee warm, pins 19 would be disconnected from the source of electricity.

When making coffee in a vacuum type coffee maker, it is desirable to keep the heat high for a limited period of time after the water in the lower vessel has risen to the upper vessel. It is necessary to maintain the hot water in contact with the coffee for a period of time in order to get a good brew. This invention is particularly designed to accomplish this desired result. When the amplitude of vibrations of vibrative element 30 reaches the point where contact is made with cage 35, the heat is not immediately turned off, but it is turned off only after a large enough number of pulses of current have been allowed to flow through heating wire 22. The delay in action of snap switch 24 is adjustable by means of actuating screw 23. Another great advantage which results, is that a casual and unintended shaking of the table on which the coffee maker is mounted, while it may cause vibrative member 30 to oscillate and make contact, it will not allow enough current to flow through heating wire 22 to cause the heat to be turned off. A continuous series of regular vibrations of the coffee vessel and resilient support 17 is necessary to cause the heat to be shut off. An even further advantage of the invention is that the cut off action is exceedingly positive. The contact made by vibrative member 30 to the cage 35 is not itself depended upon, to shut off the heat, but rather the pulses of current which result from a series of momentary contacts, are used to heat bi-metal 20 and positively actuate snap switch 24.

Referring now to Figure 9 wherein I show an alternative form of the invention, the bimetallic strip 20 surrounded by heating wire 22 which I have previously described, is replaced by a spring loaded mechanism 71 operated by thermo-responsive wire 70. Spring 72 acts on lever 73 against the restraining influence of wire 70 to rotate lever 73 about pivot 74. When current flows through wire 70, the heat produced causes wire 70 to expand in length so that spring 72 is operative to rotate lever 73 and cause actuating screw 23 to bear against snap switch 24 thereby operating contacts 45 and 46. After contacts 45 and 46 are opened, no more current flows through wire 70 and it contracts to its normal length, returning lever 73 to its normal position. In other respects the embodiment shown in Figure 9 is similar to the embodiment previously described.

While I have described two variations of the invention, it is of course to be understood that many variations could be made thereto without departing from the spirit and scope of the invention. For example, referring to Figure 8, bimetallic strip 20 could be constructed so as to have contacts 45 and 46 mounted thereon, rather than separately mounted. The arrangement of button-actuated spring member 48, snap switch 24 and bimetallic strip 20 could be changed and simplified without departing from the invention. It is of course to be understood that heating wire 22 could be related with bimetallic strip 20 in various ways other than the manner shown. Other changes could be made without departing from the scope of the invention as defined by the appended claim.

What I claim is:

A stove for vacuum-type coffee makers comprising a resiliently mounted vessel supporting surface, an electric heating element arranged in proximity to said surface, an energizing circuit for said heating element, a switch arranged in the circuit for controlling the latter, an actuator for said switch and operatively engageable therewith to effect movement of the switch to an "off" position, a thermo responsive wire engaged with said actuator and normally retaining the same out of engagement with said switch, and an inertia switch connected in circuit with said thermo responsive wire to produce a series of pulses of current through said wire to heat the latter and thereby release the actuator for movement of the latter into engagement with the switch to effect a movement of said switch to "off" position.

GEORGE B. DAVIS, Jr.

REFERENCES CITED

The following references are of record in the file of this patent:

UNITED STATES PATENTS

| Number | Name | Date |
| --- | --- | --- |
| 2,008,484 | Belcher | July 16, 1935 |
| 2,168,158 | Hall | Aug. 1, 1939 |
| 2,170,070 | Deleray | Aug. 22, 1939 |
| 2,179,811 | Brosseau | Nov. 14, 1939 |
| 2,281,319 | Newell | Apr. 28, 1942 |
| 2,301,070 | Myers | Nov. 3, 1942 |
| 2,370,404 | Huck | Feb. 27, 1945 |
| 2,385,694 | Davis | Sept. 25, 1945 |
| 2,388,335 | McCullough | Nov. 6, 1945 |
| 2,402,163 | Huenergardt | June 18, 1946 |
| 2,402,576 | Purpura | June 25, 1946 |
| 2,567,188 | Davis | Sept. 11, 1951 |